United States Patent [19]

Namekawa, deceased et al.

[11] Patent Number: 4,961,427
[45] Date of Patent: Oct. 9, 1990

[54] ULTRASONIC DOPPLER DIAGNOSTIC APPARATUS

[75] Inventors: Kouroku Namekawa, deceased, late of Hoya, by Tsuneko Namekawa, heiress; Naoki Namekawa, heir, Oomiya, all of Japan

[73] Assignee: Aloka Co., Ltd., Tokyo, Japan

[21] Appl. No.: 261,783

[22] Filed: Oct. 24, 1988

[30] Foreign Application Priority Data

Oct. 23, 1987 [JP] Japan .................. 62-269012

[51] Int. Cl.$^5$ ................................ A61B 8/00
[52] U.S. Cl. ..................... 128/661.09; 73/861.25
[58] Field of Search ............ 128/661.08–661.10; 73/861.25

[56] References Cited

U.S. PATENT DOCUMENTS 4,622,977 11/1986 Namekawa et al. ......... 73/861.25 X

Primary Examiner—Francis Jaworski
Attorney, Agent, or Firm—Koda & Androlia

[57] ABSTRACT

An ultrasonic Doppler diagnostic apparatus which transmits an ultrasonic wave into a subject under observation, detects the velocity of movement of a moving reflective member such as blood flow within the heart or a coronary artery of the subject, and displays the detected velocity information as an image. The apparatus transmits an ultrasonic pulsed wave into a subject, receives the echo reflected from the subject, converts the clutter signal contained in the received signal into a complex clutter signal in a complex signal converter, and uses this complex clutter signal as a complex reference signal for mixing with the received signal to produce a complex signal.

When the complex clutter signal is used as a complex reference signal in this way, it is possible to obtain a complex signal free of the velocity information related to slow moving members such as the blood vessel wall and the heart wall which is contained in the received signal. A velocity distribution computing unit carries out velocity detection computation, for example autocorrelation computation, on the complex signal, whereby it is possible to extract velocity information relating solely to the blood flow and free from the effects of the movement of the surrounding tissue and in particular is possible to display as an image information on blood flow near the heart wall or on blood flow within a coronary artery.

11 Claims, 4 Drawing Sheets

FIG. 6 (A) RECEIVED SIGNAL

FIG. 6 (B) OUTPUT OF SQUARE CIRCUIT

FIG. 6 (C) FILTER OUTPUT

FIG. 6 (D) OUTPUT Q OF SQUARE-WAVE CIRCUIT

FIG. 6 (E) OUTPUT $\bar{Q}$ OF SQUARE-WAVE CIRCUIT

FIG. 6 (F) OUTPUT OF ONE-HALF FREQUENCY DIVIDER

FIG. 6 (G) OUTPUT OF ONE-HALF FREQUENCY DIVIDER

FIG. 6 (H) FILTER OUTPUT

FIG. 6 (I) FILTER OUTPUT

ULTRASONIC DOPPLER DIAGNOSTIC APPARATUS

BACKGROUND OF THE INVENTION

1. Field of the Invention

The present invention relates to an ultrasonic Doppler diagnostic apparatus, more particularly to an improved ultrasonic Doppler diagnostic apparatus capable of accurately detecting or measuring the velocity of movement of moving reflective members, e.g. blood flow within the heart or within a coronary artery, in a subject under observation.

2. Description of the Prior Art

The ultrasonic pulsed Doppler method has been practically applied to the measurement of the velocity of movement of moving reflective members within a subject under observation, specifically to the measurement of the velocity of movement of blood flow in the body organs such as the heart, of blood flow in the circulatory organs and blood vessels, of other body fluids, and of the cardiac muscles. The velocity of movement of the moving reflective member is electrically detected from the frequency shift of an echo reflected from the moving reflective member within the subject. More specifically, an ultrasonic pulsed wave of a given fixed pulse repetition frequency is transmitted into a subject, the echo from a moving reflective member in the subject is received, the distance to the moving reflective member is determined from the time required for the ultrasonic pulsed wave to travel to and from the moving reflective member, and the velocity of the moving reflective member is determined by calculating the frequency shift (resulting from the Doppler effect) in the frequency of the received echo signal.

However, the conventional ultrasonic Doppler diagnostic apparatus has a problem in that when a clutter signal (i.e. a signal reflected from a slow moving blood vessel wall, heart wall or cardiac muscle) which has a larger amplitude than the Doppler signal (i.e. a signal including the Doppler shift frequency) representing the velocity of movement of the blood flow or the like gets mixed with the Doppler signal, the presence of the clutter signal hinders the detection and measurement of the velocity of movement of the moving reflective member.

Conventionally, the strength of clutter signals of this type has been reduced by using a filter for eliminating low frequency components. For example, in a color flow mapping system which provides a real-time B-mode display of the velocity distribution of moving reflective members, while there is used a delay-line canceler or other type filter with comb-like frequency characteristics, it is necessary for effective elimination of the clutter signal component to use a filter with still sharper cutoff frequency characteristics. The problem is, however, that sharper filters have more complex structures.

Moreover, it is known that the use of a filter with sharp cutoff frequency characteristics results in a longer response time because of the numerous delay-line stages involved, which in turn degrades the real-time characteristics of the detected image.

On the other hand, the conventional filter having a short response time is incapable of adequately suppressing the clutter signals and thus is incapable of overcoming the problem of reduced measurement precision.

Further, since the amplitude of the clutter signal is greater than the amplitude of the blood flow signal, even if the clutter signal is removed by a filter to some extent, the remaining portion thereof will still prevent the detection of some moving reflective members. In this regard, consider the case of a coronary artery running along the heart wall. Since the coronary artery itself moves together with the movement of the heart wall, the signal representing the flow of blood within the coronary artery will be hidden within a clutter signal caused by the movement of the heart wall. A similar situation arises in the case of blood flow within the heart in the vicinity of the heart wall, and in fact it has not been possible to measure the velocity of such blood flow accurately with the conventional apparatus.

SUMMARY OF THE INVENTION

In view of the above-mentioned problems of the conventional apparatuses, the object of the invention is to provide an ultrasonic Doppler apparatus capable of suppressing the clutter signals with a short response time without need for a filter with sharp cutoff frequency characteristics and of accurately deriving the velocity of moving reflective members in the vicinity of a member such as the heart wall which moves at a low velocity.

In order to attain this object, the present invention provides an improved ultrasonic Doppler diagnostic apparatus of the type wherein an ultrasonic pulsed wave of a given fixed pulse repetition frequency is transmitted into a subject, the reflected echo is received, the received signal is converted into a complex signal by being mixed with a complex reference signal in a complex signal converter, and the distance to and the velocity of a moving reflective member within the subject are detected, the improvement comprising an ultrasonic Doppler diagnostic apparatus with a complex clutter generator for converting any clutter signal contained in the received signal into a complex clutter signal and using this complex clutter signal as a complex reference signal.

In the ultrasonic Doppler diagnostic apparatus constituted in this manner, the clutter signal component contained in the signal received from the subject is converted into a complex clutter signal in the complex clutter generator and this complex clutter signal is supplied to the complex signal converter as a complex reference signal. This complex clutter signal consists of two signals differing in phase by 90 degrees so that by mixing it with the received signal supplied to the complex signal converter, the received signal can be converted to a complex signal.

The so-obtained complex signal is one exhibiting good separation between the clutter signal and the Doppler signal (e.g. blood flow signal) and by subjecting it to velocity computation, it becomes possible to derive an accurate imagewise representation of the velocity and the like of blood flow in the vicinity of the heart wall, which, owing to the presence of the clutter signal, has not heretofore been possible.

BRIEF DESCRIPTION OF THE DRAWINGS

FIG. 6 is a waveform diagram for explaining the operation of the complex clutter generator shown in FIG. 2.

DESCRIPTION OF PREFERRED EMBODIMENTS

The invention will now be explained with reference to a preferred embodiment.

Figure 1:
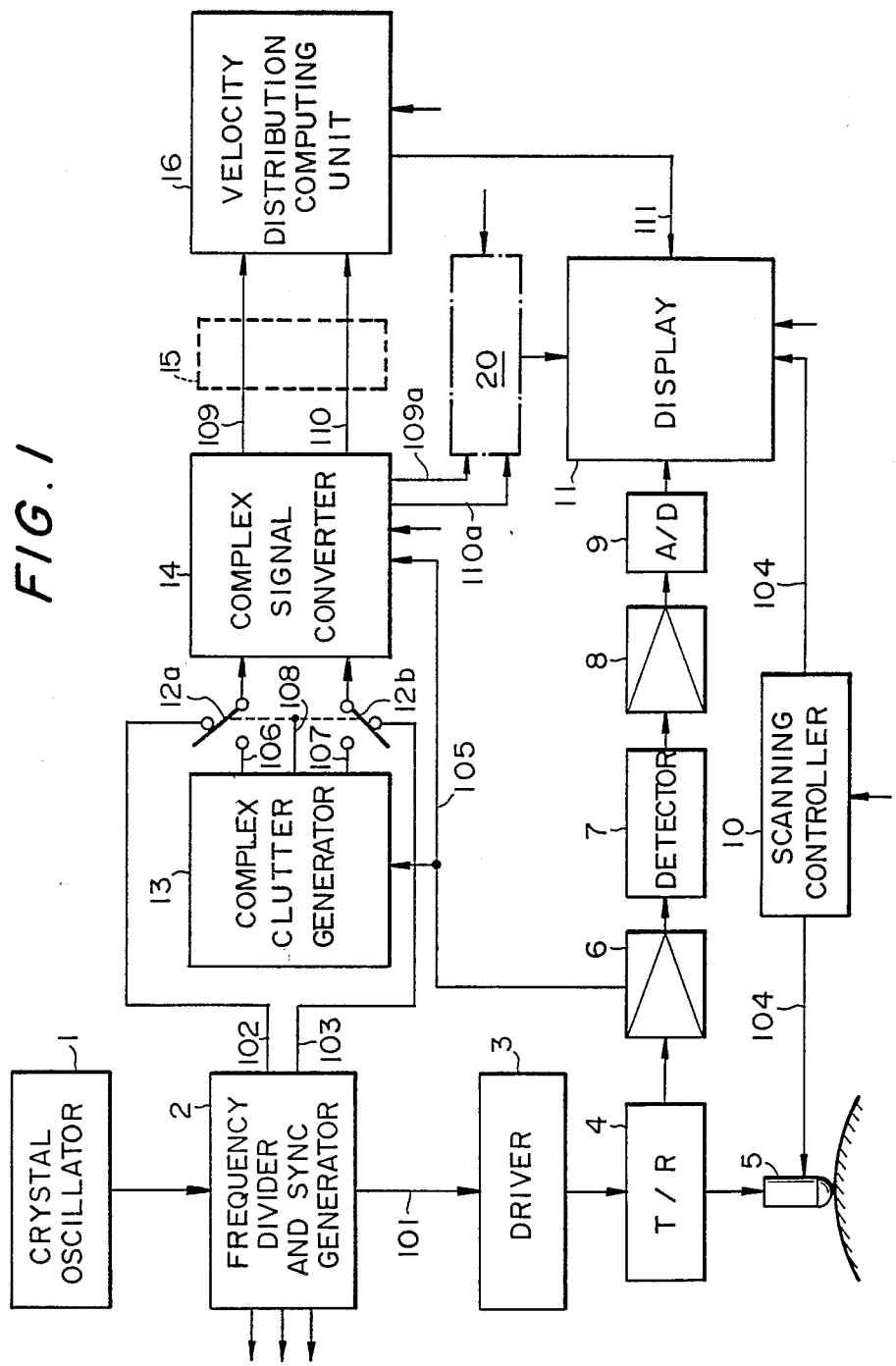
FIG. 1 is a block circuit diagram of a first embodiment of the ultrasonic Doppler diagnostic apparatus according to the invention.

FIG. 1 shows a block circuit diagram of a first embodiment of the ultrasonic Doppler diagnostic apparatus according to the invention.

Figure 2:
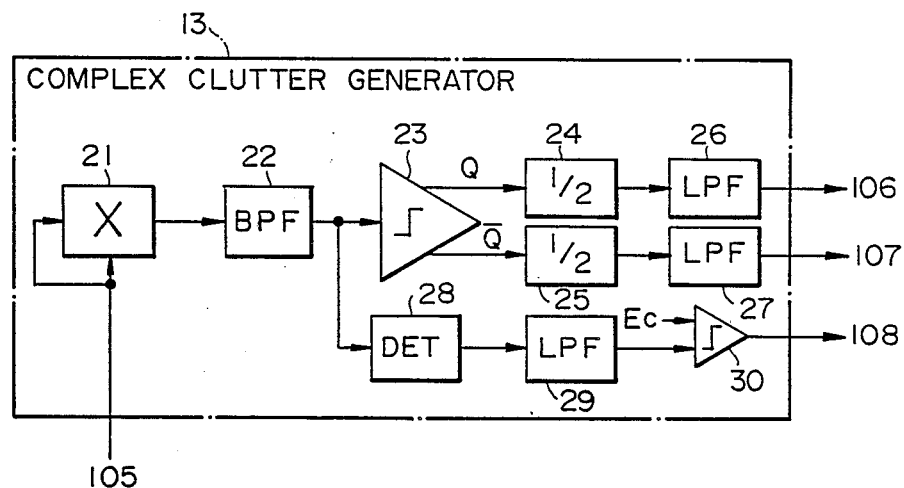
FIG. 2 is a block diagram showing the circuit arrangement of a complex clutter generator.
Figure 3:
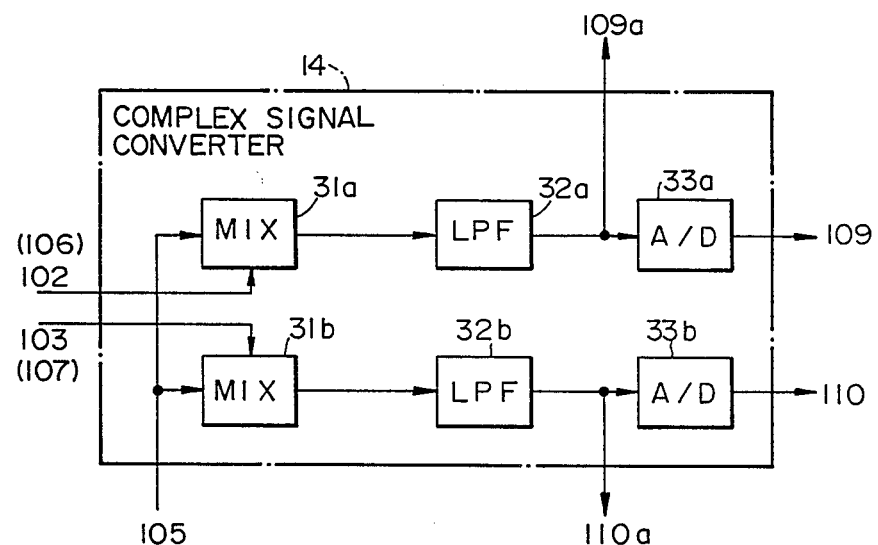
FIG. 3 is a block diagram showing the circuit arrangement of a complex signal converter.
Figure 4:
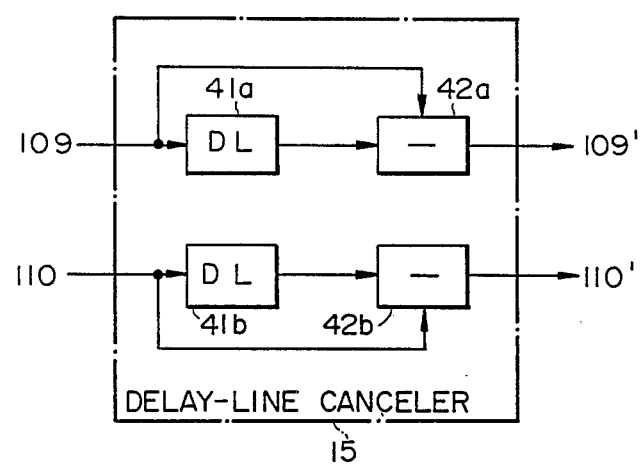
FIG. 4 is a block diagram showing the circuit arrangement of a delay-line canceler.
Figure 5:
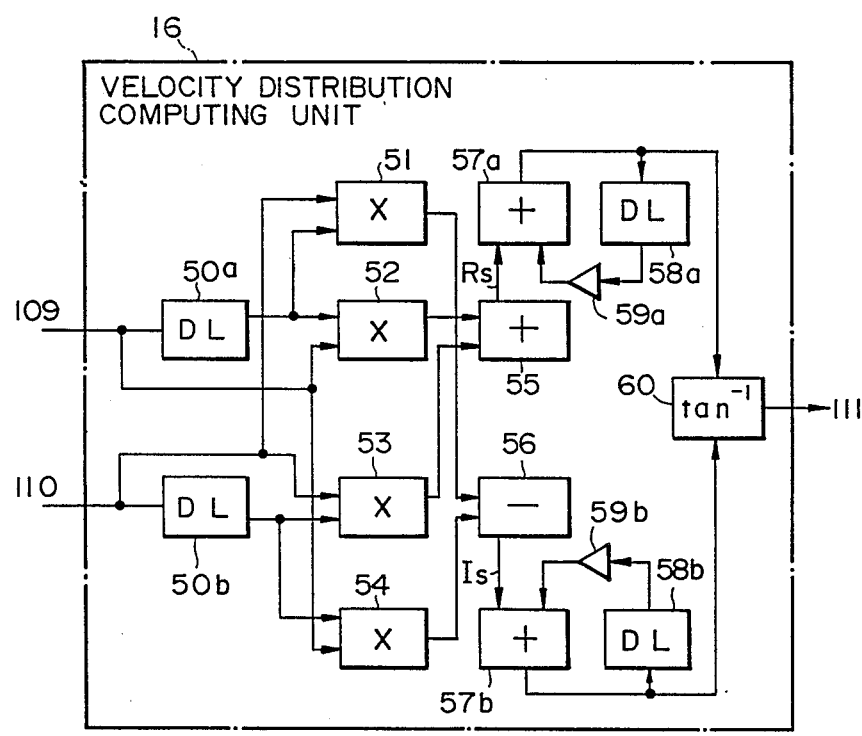
FIG. 5 is a block diagram showing the circuit arrangement of a velocity distribution computing unit.

FIG. 1 is an overall view of the circuit of one embodiment of the ultrasonic Doppler diagnostic apparatus according to the present invention. FIGS. 2, 3 and 5 respectively show the circuit arrangements of a complex clutter generator 13, a complex signal converter 14 and a velocity distribution computing unit 16 used in the apparatus shown in FIG. 1. FIG. 4 illustrates the arrangement of a delay-line canceler 15 which can be optionally incorporated in the apparatus according to the invention. The description will be begun with a brief explanation of the processes from the transmission and reception of an ultrasonic pulsed wave to the display of a B-mode image.

Transmission and reception of ultrasonic pulsed wave

Referring to FIG. 1, a crystal oscillator 1 produces a stable high frequency signal which is forwarded to a frequency divider and sync generator 2 for producing a number of output signals of desired frequencies. These output signals include, for example, a pulse rate signal (3 MHz) 101 used for transmission of an ultrasonic pulsed wave, complex reference signals 102, 103 for conventional complex conversion which differ in phase by 90 degrees, a sweep synchronization signal for use in displaying the results of the ultrasonic diagnosis, and clock signals for synchronizing the various sections of the apparatus. The frequency of the complex reference signals 102, 103 is also 3 MHz, the same as that of the pulse rate signal 101.

One output of the frequency divider and sync generator 2 is supplied to a probe 5 through a driver 3 and a duplexer 4 and upon being excited by the driver 3, the probe 5 transmits an ultrasonic pulsed wave into the subject.

The echo from the subject includes not only the signals reflected by the tissue of the subject but also weak signals from blood flow etc. and representing states of movement. This echo is converted into an electrical signal by the probe 5 and is forwarded through the duplexer 4 to a high frequency amplifier 6 by which it is amplified to a prescribed degree. One of two outputs of the high frequency amplifier 6 is sent to a display section as an ordinary B-mode display signal.

The signal output for carrying out ordinary B-mode display is supplied via a detector 7, a video amplifier 8 and an A/D converter 9 to a display 11, which may be a CRT display or the like, and is used for brightness modulation of the image on the display 11.

A scanning controller 10 is provided for angularly deflecting the ultrasonic pulsed wave from the probe 5, either mechanically or electrically, so as to periodically scan the subject. An address signal 104 output by the scanning controller 10 and indicating the wave direction is supplied to a digital scan converter (DSC) (not shown) in the display 11, whereby the echo signal from the A/D converter 9 is stored in memory of DSC. Then if the echo signal is once again read out synchronously with the sweep period of the CRT display, a tomographic image can be displayed two-dimensionally on the display 11.

The other output from the high frequency amplifier 6 is subjected to velocity computation processing and in this invention is converted into a complex signal.

Complex clutter generator

What characterizes this invention is that the complex reference signals required for the aforesaid complex signal conversion are formed from the clutter signal and for this purpose there is provided a complex clutter generator 13, the circuit of which is shown in detail in FIG. 2. To start with, the circuit arrangement of this complex clutter generator 1 will be explained.

Referring to FIG. 2, the complex clutter generator 13 comprises a square circuit 21 for squaring the received signal 105 which is the other output of the high frequency amplifier 6, a band-pass filter 22, a square-wave circuit 23, one-half frequency dividers 24, 25, and low-pass filters (LPF) 26, 27. In this embodiment, the complex clutter signals are used as complex reference signals only in the case where a clutter signal is present, while in other cases the apparatus is switched over to use ordinary complex reference signals 102, 103. For this purpose, the complex clutter generator 13 is provided with a detector 8, a low-pass filter 29 and a comparator 30, and the circuit formed by these detects the magnitude of the clutter signal.

The operation of the complex clutter generator 13 of the aforesaid structure will now be explained with reference to FIG. 6.

The received signal shown in FIG. 6(A), which is the other output of the high frequency amplifier 6 and includes the blood flow Doppler signal and a clutter signal, is first squared by the square circuit 21.

Denoting the amplitude of the clutter signal included in the received signal as A, the fundamental wave E of the clutter signal can be expressed as $$E = A \cos 2\pi (f_o + k\, f_o\, v)\, t \ldots \quad (1)$$

($f_o$: transmission frequency, k: constant, and v: clutter velocity), $k\, f_o\, v$ being the Doppler shift frequency of the clutter signal. The output of the square circuit 21 thus becomes $$A^2 \cos^2 2\pi (f_o + k\, f_o\, v)\, t = A^2/2 + A^2/2 \cdot \cos 2\pi (2 f_o + 2 k\, f_o\, v)\, t \ldots \quad (2)$$

and since the waveform becomes as shown in FIG. 6(B), the received signal can in this way be divided into a spectrum appearing in the vicinity of a direct current component and a spectrum centered on the double frequency (2 $f_o$). In this case, the Doppler shift frequency of the clutter signal $k\, f_o\, v$ is also simultaneously doubled.

The signal represented by the equation (2) is removed of its unrequired direct current component by being passed through the band-pass filter 22, which has a center frequency of 2 $f_o$, whereby there is derived a signal with the waveform shown in FIG. 6(C). This signal is then formed into two square-wave signals by the square-wave circuit 23.

The square-wave circuit 23 amplifies the signal input thereto and then by clipping its positive and negative peaks, forms it into two substantially square waves, thus producing an output Q and an output $\overline{Q}$ of opposite phase, as shown in FIG. 6(D) and FIG. 6(E).

The frequencies of these outputs are divided in half by the one-half frequency dividers 24, 25 to obtain two signals which, as shown in FIGS. 6(F) and (G), are of the same frequency but differing in phase by 90 degrees. As a result, since the frequency of the signals output by the square-wave circuit 23 is approximately $2f_o$, the frequency of the signals output by the one-half frequency dividers 24, 25 is approximately $f_o$, which is the same as the frequency of the clutter signal.

Next, the aforesaid square wave signals are removed of their high-frequency components by the low-pass filters 26, 27. As shown in FIGS. 6(H) and 6(I), the low-pass filters 26, 27 output two sine waves of the same frequency but differing in phase by 90 degrees. These sine waves are complex clutter signals 106, 107. The complex clutter signals 106, 107 are used as the complex reference signals for converting the received signal into a complex signal.

The significance of using such complex clutter signals as the complex reference signals for complex conversion will now be explained briefly.

As mentioned earlier, the received signal 105 output by the high frequency amplifier 6 contains not only a signal corresponding to the part of the echo reflected from the blood flow but also a signal of greater amplitude corresponding to the part of the echo reflected from the blood vessel wall and the muscle tissue surrounding the blood vessel (the clutter signal), and this clutter signal hinders the detection of the blood flow Doppler signal. This is particularly true in cases where the blood vessel concerned is one which moves with breathing of the subject or pulsation of the blood flow or is a coronary artery or other blood vessel in close contact with the heart, since in such cases the Doppler signal from the blood vessel is of large amplitude and low frequency, i.e. is a clutter signal which makes it difficult to extract in good condition only the Doppler signal from the blood flow.

Conventionally, the clutter signal has been removed by use of a filter with sharp cutoff frequency characteristics. There is, however, a limit to the sharpness of the cutoff frequency characteristics that can be obtained in such a filter and, moreover, the sharper the frequency characteristics are, the longer the filter response time becomes.

In the present invention, therefore, instead of using a filter with sharp cutoff frequency characteristics, the complex clutter signal is used as a complex reference signal, whereby the frequency of the clutter signal can be shifted to near zero (converted to a direct current component) and be effectively removed by a filter. The adoption of this arrangement also makes it possible to display the velocity of the reflective moving member concerned in real time.

While the received signal 105 input to the complex clutter generator 13 includes a clutter signal component and a blood flow signal component, the mean frequency of this signal is determined by the frequency of the clutter signal so that the complex clutter signals 106, 107 output by the complex clutter generator 13 are of a frequency close to that of the equation (1).

Here it should be noted that in this embodiment the complex clutter signals are used as the complex reference signals only when the received signal includes a clutter signal and, as required, the complex clutter generator 13 outputs a switchover signal 108 for switching between ordinary complex reference signals 102, 103 and the complex clutter signals 106, 107. Further, the embodiment has an electronic switch 12 provided between the complex clutter generator 13 and the complex signal converter 14 for switching between the ordinary complex reference signals 102, 103 supplied by the frequency divider and sync generator 2 and the complex clutter signals 106, 107 supplied by the complex clutter generator 13.

More specifically, as shown in FIG. 2, a second output from the band-pass filter 22 is supplied to the detector 28 and after detection thereby is removed of its high-frequency component by the low-pass filter 29. As a result, there is obtained a direct current signal proportional to the square of the amplitude of the clutter signal ($A^2/2$). This signal is supplied to the comparator 30 and compared with a reference voltage $E_c$, and when the amplitude of the clutter signal is larger than the reference voltage $E_c$, the comparator 30 produces a signal with a sharply rising leading edge. Therefore, when the received signal contains a clutter signal, the comparator 30 outputs the switchover signal 108 to the electronic switch 12 so that, instead of the ordinary complex reference signals 102, 103, the complex clutter signals 106, 107 are sent to the complex signal converter 14 via the electronic switch 12.

In this embodiment of the ultrasonic Doppler diagnostic apparatus, for detecting the Doppler shift frequency which constitutes the velocity information, the received frequency is converted into a complex signal, on the basis of which complex computation is carried out and for this purpose there is provided the complex signal converter 14 and the velocity distribution computing unit 16. A detailed explanation of this velocity computation can be found in U.S. Pat. No. 4,573,477.

As shown in FIG. 3, the complex signal converter 14 is constituted of a pair of mixers 31a, 31b, a pair of low-pass filters 32a, 32b and a pair of A/D converters 33a, 33b, and converts the received signal 105 into two signals complexly related to each other.

As shown in FIG. 5, the velocity distribution computing unit 16 is constituted of delay lines 50a, 50b for delaying the input signal for a predetermined period, multipliers 51, 52, 53, 54, adder 55 and subtracter 56 for carrying out complex computation, signal averaging circuits and argument computing unit 60. The signal averaging circuits are constituted of adders 57a, 57b, delay lines 58a, 58b and weighting circuits 59a, 59b.

A brief explanation will now be given regarding the operation of the complex signal converter 14 and the velocity distribution computing unit 16. The received signal 105 output by the high frequency amplifier 6 is mixed with the complex clutter signal 106 output by the complex clutter generator 13 in the mixer 31a and is mixed with the complex clutter signal 107 output by the complex clutter generator 13 in the mixer 31b, thereby to obtain two signals complexly related to each other. For example, each converted signal has a real part R and an imaginary part I and can be expressed as the complex signal $Z = R + iI$. Then these complex signals are passed through the lowpass filters 32a, 32b, whereby only the difference frequency component of each is extracted.

The complex signals Z obtained in this manner are analogue signals and for increasing the accuracy of the computation are supplied to the A/D converters 33a, 33b for conversion to digital signals.

The complex signals obtained in this manner are then subjected to velocity computation in the velocity distribution computing unit 16. For carrying out the velocity computation there car be used the complex autocorrelation method disclosed in U.S. Pat. No. 4,573,477.

First, the signals 109, 110 output from the A/D converters 33a, 33b, namely the complex signals Z, are delayed by, for example, one period of the pulse repetition interval by delay lines 50a, 50b, whereafter the four multipliers 51, 52, 53, 54, the adder 55 and the subtracter 56 carry out autocorrelation computation on the basis of the complex signals differing by one period.

As a result, there are obtained from the adder 55 and the subtracter 56 autocorrelation signals S (complex signals), which can be represented as $S = R_s + iI_s$. As these autocorrelation signals S include fluctuation components of the received signal and noise components generated by the apparatus, they are averaged in order to remove these noise components.

The averaging circuits for this purpose are composed of the adders 57a, 57b, the delay lines 58a, 58b and the weighting circuits 59a, 59b. The one-period delayed signals from the delay lines 58a, 58b are added to the current input signal in the adders 57a, 57b and the resulting outputs are returned to the delay lines 58a, 58b, and the operation is repeated. However, if this operation is simply repeated, the magnitude of the outputs will successively increase with the increasing number of additions until at last saturation is reached. Therefore, weighting circuits 59a and 59b are provided for attenuating the outputs of the delay lines 58a, 58b before adding them to the inputs of the adders 57a, 57b, whereby optimum averaging can be realized.

Then the argument of the autocorrelation signals, namely, $\tan^{-1}(I_s/R_s)$, is obtained in the argument computing unit 60. This argument of the autocorrelation signals corresponds to the Doppler frequency shift in the received signal as a result of the Doppler effect, and corresponds to the velocity signal.

It should be noted that after conversion to a complex signal in the complex signal converter 14, a delay-line canceler 15 can be used for eliminating the clutter signals received from the stationary or slow moving members within the subject so as to obtain velocity signals for only the moving reflective member.

As shown in FIG. 4, the delay-line canceler 15 has delay lines 41a, 41b each of which has a delay time equal to, for example, one period of the pulse repetition interval. These delay lines 41a, 41b can be constituted of memories or shift registers. The delay lines 41a, 41b are respectively connected with subtracters 42a, 42b which successively compare the inputs to the delay lines 41a, 41b (i.e. the signals during the current period) with the outputs thereof (i.e. the signals during the preceding period) at the same depth within the subject and calculate the difference between consecutive periods. Therefore, since in the case of the echo signals from the stationary and slow moving parts of a living organism, namely the clutter signals, there is little or no frequency difference between the signals of the current and preceding periods, the output of the subtracters 42a, 42b approaches zero.

On the other hand, the output: differences for the high velocity portions, for example the blood flow signals, are obtained as large outputs. Thus, clutter signals can be suppressed and the quality of the image signal can be greatly improved.

The overall operation of the embodiment constituted as described in the foregoing will now be explained with reference to FIG. 1.

When the electronic switch 12 has been switched to the side of the complex clutter generator 13 by the switchover signal 108 from the complex clutter generator 13, the complex clutter signals 106, 107 are supplied to the complex signal converter 14 as complex reference signals. As the received signal 105 input to the complex signal converter 14 is the sum of a blood flow signal and a clutter signal, the signals output by the complex signal converter 14 are the sum of a complex signal $Z_c$ obtained by mixing a complex clutter signal (a complex reference signal) with a clutter signal and a complex signal $Z_d$ obtained by mixing the aforesaid complex clutter signal with a blood flow signal, namely, are signals represented by $Z_c + Z_d$.

As the clutter signal and the complex clutter signal contain the same Doppler component of the clutter, the aforesaid complex signal $Z_c$ is converted to a spectrum concentrated in the vicinity of zero frequency (to a direct current component). Therefore, by extracting the complex signal $Z_d$, which is of a different frequency, the blood flow signal can be separated from the clutter signal and extracted independently.

For example, when the signals are passed through the aforesaid delay-line canceler 15, the complex signal $Z_c$ is reduced to a lower frequency than the cutoff frequency so that it becomes possible to increase the removal effect of the filter. While at this time the complex signal $Z_d$ is also shifted to a lower frequency, since the Doppler frequency of the blood flow signal is greater than the Doppler frequency of the clutter signal, it is within the range of frequencies that can pass the delay-line canceler 15, and as a result, the S/N ratio with respect to the clutter signal is improved.

In this way, the clutter signal can be effectively suppressed without need for making the cutoff characteristics of the filter sharp, and where a filter is used, it is possible to use one with rapid response, whereby the effect of the clutter signal can be eliminated and the blood flow velocity effectively detected.

On the other hand, when no clutter signal is present, the electronic switch 12 is in contact with the frequency divider and sync generator 2 side so that the ordinary complex reference signals 102, 103 are supplied to the complex signal converter 14. Therefore, the extraction of only the blood flow signal and the computation of the velocity distribution information in the velocity distribution computing unit 16 is carried out in the conventional manner.

The output 111 obtained from the velocity distribution computing unit 16 by using the clutter signal or the ordinary complex reference signal, as the case may be, is sent to the display 11 where the velocity information is displayed as superposed on the B-mode tomographic image.

Figure 7:
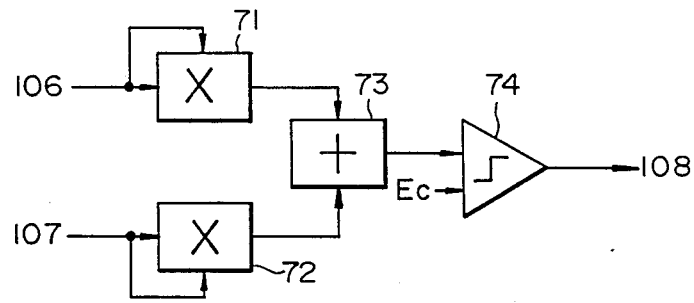
FIG. 7 is a block diagram of another circuit for outputting a switchover signal in the complex clutter generator.

In the complex clutter generator 13 of the embodiment described above, the low-pass filter 29 etc. are used to constitute the circuit for outputting the switchover signal 108 for selecting the complex clutter signal as the complex reference signal. In this case, however, because of the delay time of the filter circuit and the like, a certain amount of time is required before output of the switchover signal 108. Thus for speeding up the generation of the switchover signal, it is possible to use a circuit as shown in FIG. 7.

This circuit is constituted of two square circuits 71, 72, an adder 73 and a comparator 74, and the complex clutter signals 106, 107 from the complex clutter generator 13 shown in FIG. 2 are input to the square circuits 71, 72, respectively. The complex clutter signals 106, 107 are sine waves of the same frequency but differing in phase by 90 degrees and can be represented as A sin $(\omega t+\phi)$ and A cos $(\omega t+\phi)$, in which case the output obtained after these signals have passed through the square circuits 71, 72 and the adder 73 become $A^2 \sin^2(\omega t+\phi) + A^2 \cos^2(\omega t+\phi) = A^2$.

The output of the adder 73 is sent to the comparator 74, which is of the same constitution as the comparator 30 in FIG. 2. Thus, the aforesaid output $A^2$ is compared with the reference voltage $E_c$ and when it is larger than the reference voltage, the switchover signal 108 is output.

As this circuit includes no detector or filter circuit, it enables rapid switching to and from the complex clutter signal.

The ultrasonic Doppler apparatus using the complex clutter generator 13 can be applied not only in the case of the B-mode operation but also in the case of measuring the blood flow velocity in the M-mode.

This can be realized by an M-mode processor 20 included as the stage after the complex signal converter 14 in FIG. 1, in which case the ultrasonic wave is fixed in a specified direction and the blood flow information for a location at a selected depth within the subject is displayed as an image.

As the present invention enables effective elimination of clutter signals, the M-mode processor 20 can be provided with only a simple filter for removal of clutter signals, and, moreover, high-precision measurement can be realized.

As described in the foregoing, in accordance with the present invention, since a complex clutter signal obtained from a clutter signal is used as the complex reference signal, it becomes possible to realize excellent separation of clutter signals from blood flow Doppler signals which could not heretofore be detected because of the presence of clutter signals and thus, for example, to accurately extract and display on the image the velocity of blood flow within the heart or within a coronary artery in the vicinity of the heart wall which moves at a low velocity.

Moreover, the present invention is further advantageous in that there is no need to employ a filter with sharp cutoff frequency characteristics so that a filter with a simple circuit can be used and the Doppler signal included in the signal reflected from the moving reflective member can be detected in real time with high precision.

What is claimed is:

1. An ultrasonic Doppler diagnostic apparatus for detecting the distance to and velocity of a moving reflective member within a subject, comprising:
   (a) means for transmitting, into the subject, an ultrasonic pulsed wave of a given constant pulse repetition frequency and for receiving the reflected echo;
   (b) a complex signal converter for converting the received signal into a complex signal by mixing with a complex reference signal;
   (c) a complex clutter generating means for converting a clutter signal contained in the received signal into a complex clutter signal used as a complex reference signal, said complex clutter generating means being adapted to double the clutter signal frequency and to divide the doubled clutter signal frequency into one-half frequency to obtain two complex clutter signals different in phase by 90 degrees; and
   (d) means for determining the distance to and velocity of said moving reflective member within said subject from said complex signal from said complex signal converter means.

2. An apparatus according to claim 1 wherein the means for detecting comprises a velocity distribution computing means for obtaining an autocorrelation signal from the complex signal converted by said complex clutter signal generating means and computing the velocity distribution of the moving reflective member from the autocorrelation signal.

3. An apparatus according to claim 2 further comprising a delay-line canceler means having a delay line for receiving the output from said complex signal converter means, which delay-line canceler means computes the difference between a signal delayed a prescribed number of periods by said delay line and the current signal being input thereto and outputs a signal corresponding to the computed difference, whereby the clutter signal is suppressed.

4. An apparatus according to claim 2 further comprising a display means for displaying as superposed on a B-mode image and/or as an M-mode image the velocity information regarding said moving reflective member obtained by using said complex clutter signal as the complex reference signal.

5. An apparatus according to claim 1 further comprising a delay-line canceler means having a delay line for receiving the output from said complex signal converting means which delay-line canceler means computes the difference between a signal delayed a prescribed number of periods by said delay line and the current signal being input thereto and outputs a signal corresponding to the computed difference, whereby the clutter signal is suppressed.

6. An apparatus according to claim 5 further comprising a display means for displaying as superposed on a B-mode image and/or as an M-mode image the velocity information regarding said moving reflective member obtained by using said complex clutter signal as the complex reference signal.

7. An apparatus according to claim 1 further comprising a display means for displaying as superposed on a B-mode image and/or as an M-mode image the velocity information regarding said moving reflective member obtained by using said complex clutter signal as the complex reference signal.

8. An apparatus according to claim 1, wherein said complex clutter generating means further includes a detecting means for detecting the amplitude of the clutter signal, said complex clutter generator being equipped with switch to conducting a switch-over control, based on a predetermined reference voltage, to output either the complex clutter signal containing the complex reference signal or a pure complex reference signal to said complex signal converter.

9. An apparatus according to claim 8 wherein the means for detecting comprises a velocity distribution computing means for obtaining an autocorrelation signal from the complex signal converted by said complex clutter signal generating means and computing the velocity distribution of the moving reflective member from the autocorrelation signal.

10. An apparatus according to claim 8 further comprising a delay-line canceler means having a delay line for receiving the output from said complex signal converter means, which delay-line canceler means computes the difference between a signal delayed a prescribed number of periods by said delay line and the current signal being input thereto and outputs a signal corresponding to the computed difference, whereby the clutter signal is suppressed.

11. An apparatus according to claim 8 further comprising a display means for displaying as superposed on a B-mode image and/or as an M-mode image the velocity information regarding said moving reflective member obtained by using said complex clutter signal as the complex reference signal.

* * * * *